United States Patent
Nakamura

(10) Patent No.: US 10,999,468 B2
(45) Date of Patent: May 4, 2021

(54) INFORMATION PROCESSING APPARATUS AND NON-TRANSITORY COMPUTER READABLE MEDIUM STORING PROGRAM FOR EXTRACTING DOCUMENTS ON WHICH READING IS UNSUCESSFULLY COMPLETED

(71) Applicant: FUJI XEROX CO., LTD., Tokyo (JP)

(72) Inventor: Shinya Nakamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/517,672

(22) Filed: Jul. 22, 2019

(65) Prior Publication Data
US 2020/0296252 A1  Sep. 17, 2020

(30) Foreign Application Priority Data
Mar. 11, 2019  (JP) .............................. JP2019-044178

(51) Int. Cl.
*H04N 1/32*  (2006.01)
*G09B 7/00*  (2006.01)

(52) U.S. Cl.
CPC ....... *H04N 1/3263* (2013.01); *H04N 1/32128* (2013.01); *H04N 1/32651* (2013.01); *G09B 7/00* (2013.01)

(58) Field of Classification Search
CPC ............. H04N 1/3263; H04N 1/32128; H04N 1/32651; H04N 1/32625; H04N 2201/0094; H04N 1/00047; G09B 7/00; G06F 3/1259; G06F 3/1273; G06K 9/00469
USPC ........................................................ 358/474
See application file for complete search history.

(56) References Cited

U.S. PATENT DOCUMENTS

| | | | | |
|---|---|---|---|---|
| 2009/0240982 A1* | 9/2009 | Ogasawara | ........ | G03G 15/5025 714/16 |
| 2011/0134494 A1 | 6/2011 | Shinto | | |

FOREIGN PATENT DOCUMENTS

| | | |
|---|---|---|
| JP | 5448766 | 3/2014 |
| JP | 2018-195022 | 12/2018 |

* cited by examiner

*Primary Examiner* — Kent Yip
(74) *Attorney, Agent, or Firm* — JCIPRNET

(57) ABSTRACT

An information processing apparatus includes: an extraction unit that extracts a document on which reading is unsuccessfully completed in a surface unit in a case where a bundle of a plurality of documents including written information are optically read one by one in order; and a generation unit that generates a list of summary results in which a number indicating in what number the document including a surface is read from the bundle of documents is added to a record corresponding to the surface on which reading is unsuccessfully completed.

9 Claims, 18 Drawing Sheets

| SERIAL NUMBER OF READING PAGE | DOCUMENT | FRONT AND REAR | FORM SPECIFYING | STUDENT IDENTIFICATION NUMBER | PAGE NUMBER | TOTAL PAGE NUMBER |
|---|---|---|---|---|---|---|
| 1 | 1 | FRONT | OK | 1812001 | 1 | 4 |
| 2 | 1 | REAR | OK | 1812001 | 2 | 4 |
| 3 | 2 | FRONT | NG | | | |
| 4 | 2 | REAR | OK | 1812001 | 4 | 4 |
| 5 | 3 | FRONT | OK | 1812010 | 1 | 2 |
| 6 | 3 | REAR | OK | 1812010 | 2 | 2 |
| 7 | 4 | FRONT | OK | 1812020 | 1 | 1 |
| 8 | 4 | REAR | NG | | | |

IN CASE WHERE BOTH SURFACES ARE READ

IN CASE WHERE ONLY ONE SURFACE IS READ

FIG. 9

| 【OO UNIVERSITY ATTENDANCE SHEET】 | 1 | / | 1 | ← 61 |

| GRADED RESULT | | 1 | 5 | ← 62 |

| STUDENT IDENTIFICATION NUMBER | 1 | 2 | 3 | 4 | 5 | 6 | 7 | ← 63
| NAME | FUJI TARO | ← 64
| DATE AND TIME | 3/13/2017 | SUBJECT | MATHEMATICS | ← 66

65 → (DATE AND TIME row)

67 (blank area)

FIG. 10

FIRST PAGE

[○○ UNIVERSITY TEST]    1 / 2 ← 61

GRADED RESULT    3  8

| STUDENT IDENTIFICATION NUMBER | 1 | 2 | 3 | 4 | 5 | 6 | 7 |
|---|---|---|---|---|---|---|---|
| NAME | FUJI TARO |
| DATE AND TIME | 3/13/2017 | | SUBJECT | | MATHEMATICS |

GRADE OF QUESTION 1    9  ← 68

GRADE OF QUESTION 2    15  ← 68

FRONT SURFACE

SECOND PAGE

[○○ UNIVERSITY TEST]    2 / 2 ← 61

GRADED RESULT    3  8

| STUDENT IDENTIFICATION NUMBER | 1 | 2 | 3 | 4 | 5 | 6 | 7 |
|---|---|---|---|---|---|---|---|

GRADE OF QUESTION 3    8  ← 68

GRADE OF QUESTION 4    6  ← 68

REAR SURFACE

FIG. 11

| SERIAL NUMBER OF READING PAGE | DOCUMENT | FRONT AND REAR | FORM SPECIFYING | STUDENT IDENTIFICATION NUMBER | PAGE NUMBER | TOTAL PAGE NUMBER |
|---|---|---|---|---|---|---|
| 1 | 1 | FRONT | OK | 1812001 | 1 | 4 |
| 2 | 1 | REAR | OK | 1812001 | 2 | 4 |
| 3 | 2 | FRONT | NG | | | |
| 4 | 2 | REAR | OK | 1812001 | 4 | 4 |
| 5 | 3 | FRONT | OK | 1812010 | 1 | 2 |
| 6 | 3 | REAR | OK | 1812010 | 2 | 2 |
| 7 | 4 | FRONT | OK | 1812020 | 1 | 1 |
| 8 | 4 | REAR | NG | | | |

| INDEX NUMBER | DOCUMENT (N-TH) | FRONT AND REAR | PROCESSING RESULT | STUDENT IDENTIFICATION NUMBER |
|---|---|---|---|---|
| 1 | — | — | NORMAL COMPLETION | 1812010 |
| 2 | — | — | NORMAL COMPLETION | 1812020 |
| 3 | 1 | FRONT | PAGE SHORTAGE | 1812001 |
| 4 | 1 | REAR | PAGE SHORTAGE | 1812001 |
| 5 | 2 | FRONT | FAILURE IN FORM SPECIFYING | |
| 6 | 2 | REAR | PAGE SHORTAGE | 1812001 |

FIG. 18

| INDEX NUMBER | DOCUMENT (N-TH) | FRONT AND REAR | PROCESSING RESULT | STUDENT IDENTIFICATION NUMBER | ERROR FILE |
|---|---|---|---|---|---|
| 1 | - | - | NORMAL COMPLETION | 1812010 | - |
| 2 | - | - | NORMAL COMPLETION | 1812020 | - |
| 3 | 1 | FRONT | PAGE SHORTAGE | 1812001 | 1-1812001.pdf |
| 4 | 1 | REAR | PAGE SHORTAGE | 1812001 | 1-1812001.pdf |
| 5 | 2 | FRONT | FAILURE IN FORM SPECIFYING | | 2-1812001.pdf |
| 6 | 2 | REAR | PAGE SHORTAGE | 1812001 | 2-1812001.pdf |

INFORMATION PROCESSING APPARATUS AND NON-TRANSITORY COMPUTER READABLE MEDIUM STORING PROGRAM FOR EXTRACTING DOCUMENTS ON WHICH READING IS UNSUCCESSFULLY COMPLETED

CROSS-REFERENCE TO RELATED APPLICATIONS

This application is based on and claims priority under 35 USC 119 from Japanese Patent Application No. 2019-044178 filed Mar. 11, 2019.

BACKGROUND

(i) Technical Field

The present invention relates to an information processing apparatus and a non-transitory computer readable medium storing a program.

(ii) Related Art

In related art, there is a lesson assistance apparatus that loads a bundle of documents such as test sheets or reports into an auto document feeder (ADF), acquires graded results by recognizing texts such as a student identification number and a grade written in a document transported one by one, and generates a table in which graded results are summarized.

Examples of related art include JP2018-195022A.

SUMMARY

In actual reading, reading may be unsuccessfully completed. The causes of unsuccessful reading completion of information include, for example, a distortion or a stain of a portion to be read, omission of texts, writing of thin texts, writing of incorrect texts, and the like. For a document on which information is not normally read, it is necessary to read the document again or manually correct the information.

On the other hand, the reading result is displayed in a table form. In the table, whether or not the reading result is successful is recorded in a surface unit. Further, in the table, information of a surface on which reading is successfully completed and information of a surface on which reading is unsuccessfully completed are separately mapped.

For this reason, even in a case where an operator confirms the table, it is difficult to recognize whether reading of both surfaces of a specific document is successfully completed or whether there is a surface on which reading is unsuccessfully completed. Further, even in a situation where it is necessary to read documents again, in a case where documents of a bundle of documents are not arranged in order of student identification number, it is difficult to find the documents to be read again.

Aspects of non-limiting embodiments of the present disclosure relate to an information processing apparatus and a non-transitory computer readable medium storing a program capable of allowing an operator to easily find a target document, compared to a case where information indicating in what number a document, on which reading is unsuccessfully completed, is read from a bundle of documents is not included in a list of reading results.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an extraction unit that extracts a document on which reading is unsuccessfully completed in a surface unit in a case where a bundle of a plurality of documents including written information are optically read one by one in order; and a generation unit that generates a list of summary results in which a number indicating in what number the document including a surface is read from the bundle of documents is added to a record corresponding to the surface on which reading is unsuccessfully completed.

BRIEF DESCRIPTION OF THE DRAWINGS

Exemplary embodiment(s) of the present invention will be described in detail based on the following figures, wherein:

FIG. 9 is a diagram for explaining an example of a graded document;

FIG. 10 is a diagram for explaining another example of a graded document;

FIG. 11 is a diagram for explaining an example of a summary table to which a reading result and a document serial number are added;

FIG. 12 is a diagram for explaining an example of a list displayed on the client terminal operated by an operator who performs a reading operation of a picture image;

FIG. 15A illustrates a screen for notifying generation of the list, and FIG. 15B illustrates a screen used for downloading the list;

FIG. 18 is a diagram for explaining another example of the list displayed on the client terminal operated by an operator who performs a reading operation of a picture image.

DETAILED DESCRIPTION

Hereinafter, exemplary embodiments of the present invention will be described with reference to the drawings.

First Exemplary Embodiment

Overall Configuration of System

Figure 1:
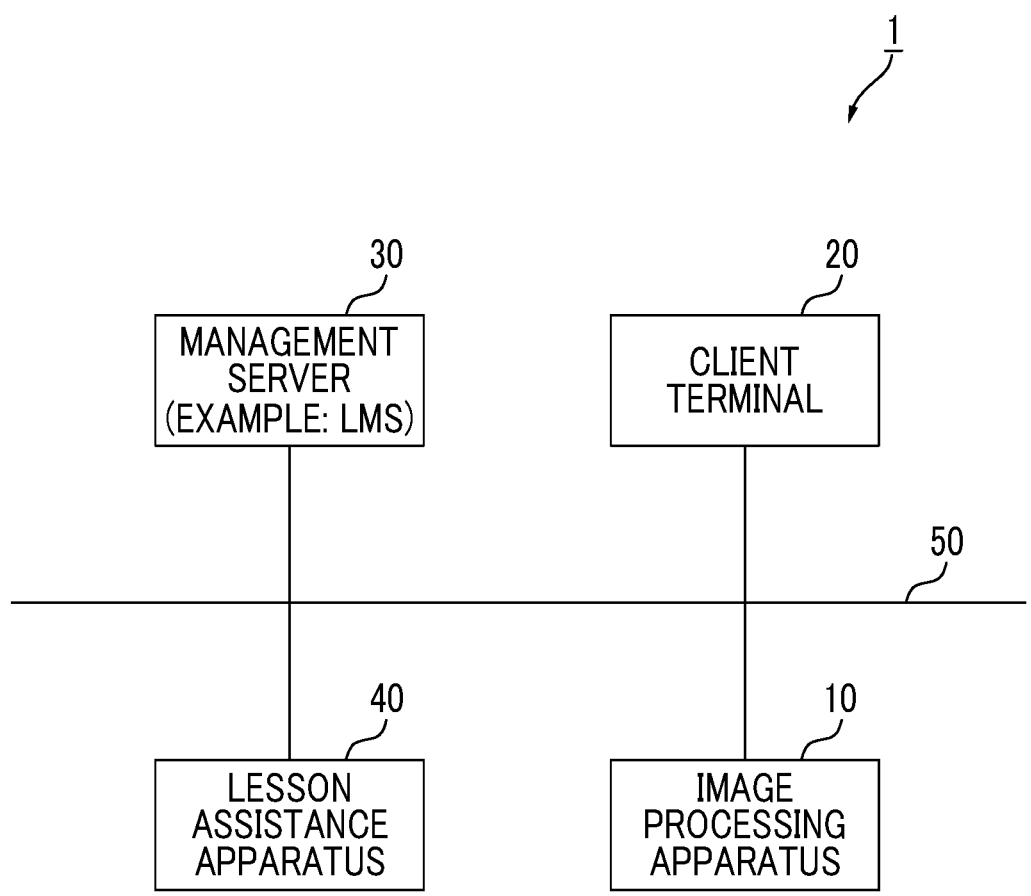
FIG. 1 is a diagram for explaining a conceptual configuration of an information processing system used in a first exemplary embodiment.

FIG. 1 is a diagram for explaining a conceptual configuration of an information processing system 1 used in a first exemplary embodiment. The information processing system 1 includes an image processing apparatus 10 including a scanner that reads a document, a client terminal 20 that is operated by a student, a teacher, an assistant, or the like, a management server 30 that manages management data, and a lesson assistance apparatus 40 that records image data of the document in the management server 30.

The image processing apparatus 10, the client terminal 20, the management server 30, and the lesson assistance apparatus 40 are connected to each other via a network 50. In a case of FIG. 1, there is one client terminal 20. On the other hand, there may be a plurality of client terminals 20 in the information processing system 1. For example, there are a client terminal 20 operated by a student, a client terminal 20 operated by a teacher, and a client terminal 20 operated by an assistant.

The image processing apparatus 10 includes a scanner that optically reads information written in a document. The scanner scans a front surface of the document with linear light and inputs reflected light from the document to an optical sensor. The scanning is relatively performed. Thus, the scanning also includes relatively-transporting of the document to a reading position of the scanner. The optical sensor converts intensities of the reflected light into gradation values and outputs the gradation values. A set of the gradation values for each pixel is a picture image of the document. As the optical sensor, for example, a charge coupled device (CCD) or a contact image sensor (CIS) is used. In the present exemplary embodiment, an auto document feeder is attached to the image processing apparatus 10.

The auto document feeder is a device that continuously picks up a plurality of stacked documents (hereinafter, referred to as "a bundle of documents") one by one and transports the documents to a reading position of the scanner one by one. The image processing apparatus 10 according to the present exemplary embodiment has a function of reading not only one surface of a document but also both surfaces of the document. The present exemplary embodiment uses paper documents that are often handled by educational institutions as an example. Examples of such paper document include answer sheets for examinations and quizzes, worksheets, comment sheets, assignments, questionnaires, and reports. The paper documents may contain quick response (QR) codes, instructions, questions, answer fields, ruled lines, and/or item names that are printed in advance. In some situations, students write their student identification number and name on such documents by hand and submit them to their teacher. When grading, the teacher writes down a comment, a grade, and the like by hand. In other situations, each copy of a document may already have a student identification number and a name printed.

The management server 30 according to the present exemplary embodiment is a server used in, for example, a learning management system (LMS), an educational affairs system, a book management system, or the like. In a case where the management server 30 is an LMS, a learning history, a learning result, an attendance record, an assignment submission record, and the like are managed as management data. In a case where the management server 30 is an educational affairs system, a course completion record, a grade, a session, a school, a department, a major, and the like are managed as management data. In a case where the management server 30 is a book management system, a book lending record, a book reading record, and the like are managed as management data.

On the other hand, one management server 30 is not limited to the above-described specific system. For example, one management server 30 may operate as a plurality of systems described above. Further, the management server 30 may cooperate with a plurality of image processing apparatuses 10. The client terminal 20 can browse the information recorded in the management server 30. The client terminal 20 operated by a student can browse learning materials, a grade of the student, and the like managed by the management server 30. The client terminal 20 operated by a teacher can browse students' grades managed by the management server 30, and can upload learning materials to the management server 30. The client terminal 20 operated by an assistant who assists a teacher can browse a list obtained by summarizing reading results of documents.

The lesson assistance apparatus 40 has a function of, for example, recognizing a text or a symbol such as a student identification number, a name, or a grade written in a document and converting the text or the symbol into a text code string. A program for recognizing a text is called a text recognition engine. The text or the symbol to be recognized may be handwritten or printed. The lesson assistance apparatus 40 according to the present exemplary embodiment generates a list obtained by summarizing recognition results, and records the list in the management server 30.

The lesson assistance apparatus 40 also has a function of sorting graded results in order of student identification number. The sorted list is also recorded in the management server 30. The lesson assistance apparatus 40 also has a function of generating a reading history of a bundle of documents and presenting the reading history to a user. The lesson assistance apparatus 40 is an example of an information processing apparatus. The lesson assistance apparatus 40 according to the present exemplary embodiment is connected to the image processing apparatus 10 via the network 50. On the other hand, the lesson assistance apparatus 40 may be directly connected to the image processing apparatus 10 via a Universal Serial Bus (USB) cable or the like. The network 50 is, for example, the Internet, a local area network (LAN), or Ethernet (registered trademark). The network 50 may be a wireless network or a wired network.

Configuration of Each Apparatus

Configuration of Image Processing Apparatus

Figure 2:
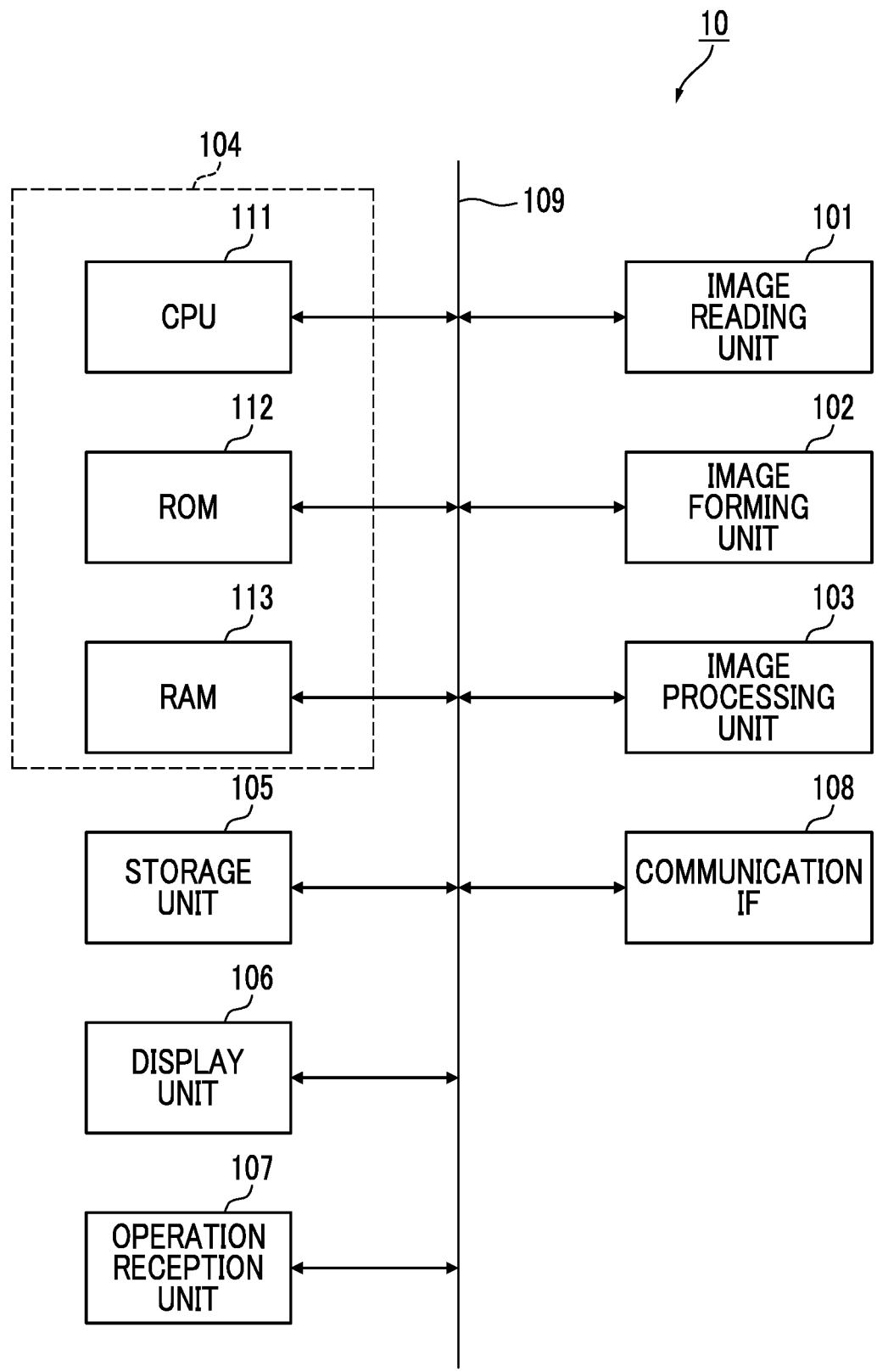
FIG. 2 is a diagram for explaining a configuration example of an image processing apparatus used in the first exemplary embodiment.

FIG. 2 is a diagram for explaining a configuration example of the image processing apparatus 10 used in the first exemplary embodiment. The configuration of the image processing apparatus 10 illustrated in FIG. 2 corresponds to a multifunctional image forming apparatus. The image processing apparatus 10 illustrated in FIG. 2 includes an image reading unit 101 that reads a picture image from a document, an image forming unit 102 that forms an image on paper as an example of a recording medium, an image processing unit 103 that performs color correction, gradation correction, or the like on document data or image data, a control unit 104 that controls an operation of the entire apparatus, a storage unit 105 that stores image data and the like, a display unit 106 that is used to display a work screen or the like, an operation reception unit 107 that receives an operation of a user, and a communication interface (communication IF) 108 that performs communication via a telephone line, a LAN cable, or the like.

As described above, the image reading unit 101 according to the present exemplary embodiment includes a so-called scanner and an auto document feeder. In the present exemplary embodiment, a reading position of the scanner is fixed. The document to be read is transported by the auto document feeder so as to pass through the reading position. The image forming unit 102 records an image on a front surface of paper by an electrophotographic method, an ink jet method, or the like. A specific mechanism of the image forming unit 102 differs depending on a recording method to be employed. The image includes a document including a text, a symbol, a picture, and the like. The image processing unit 103 is configured with a dedicated processor or a dedicated processing circuit that processes image data. The control unit 104 includes a central processing unit (CPU) 111, a read only memory (ROM) 112 in which firmware, basic input output system (BIOS), and the like are stored, and a random access memory (RAM) 113 used as a work area. The CPU 111 may be a multi-core. The ROM 112 may be a rewritable non-volatile semiconductor memory.

The storage unit 105 is a non-volatile storage device, and is configured with, for example, a hard disk drive (HDD), a semiconductor memory, or the like. The storage unit 105 stores the image data which is read by the image reading unit 101, image data which is received from the outside by communication, FAX data which is received by FAX communication, and the like. The display unit 106 is configured with, for example, a liquid crystal display, an organic electro luminescence (EL) display, or the like. The operation reception unit 107 is configured with a touch sensor provided on a front surface of the display unit 106, a switch, a button, and the like provided on an operation panel and a front surface of a housing. Further, the control unit 104 is connected to each unit via a bus 109 and a signal line (not illustrated).

Figure 3:
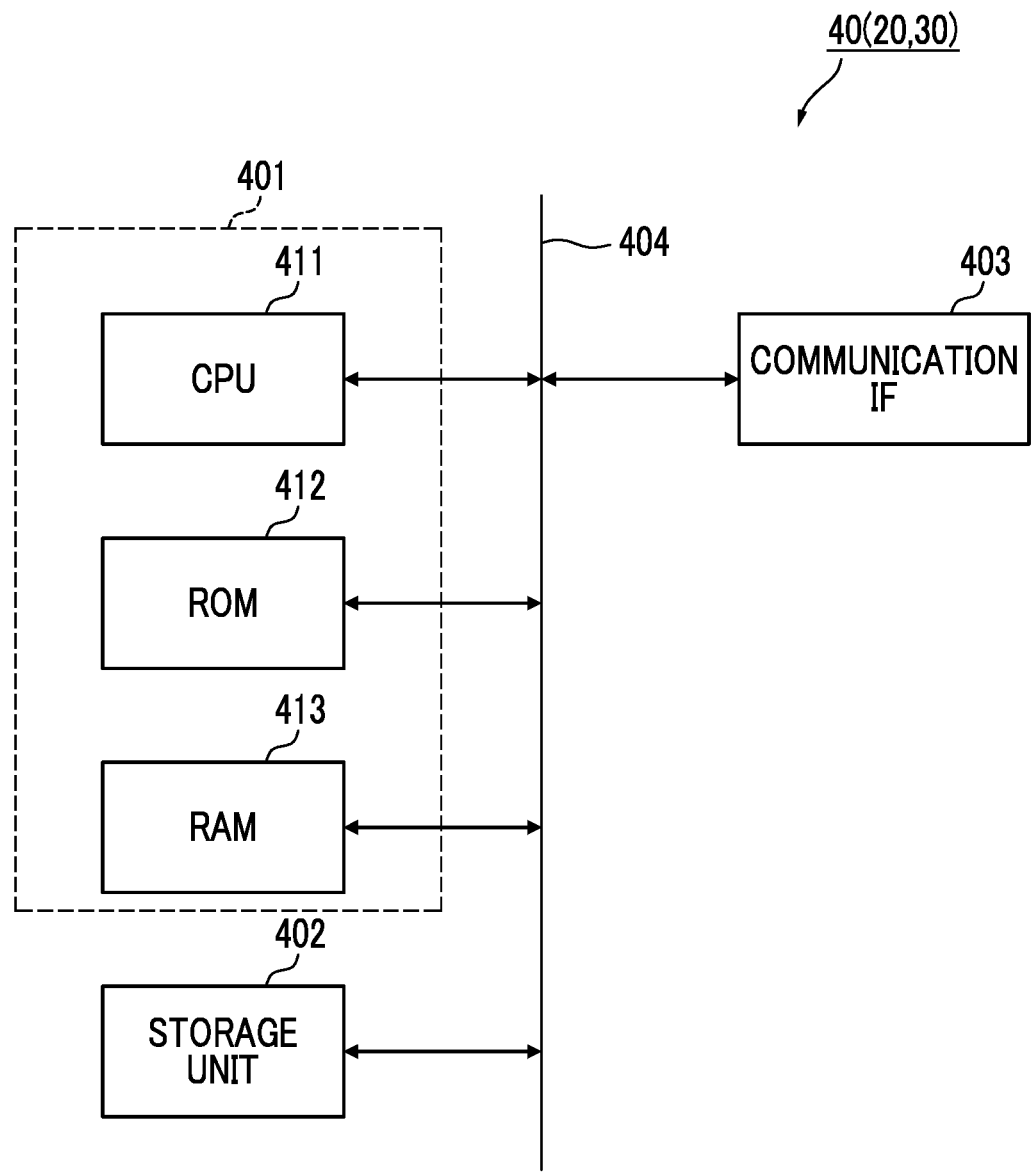
FIG. 3 is a diagram for explaining a configuration example of a client terminal, a management server, and a lesson assistance apparatus.

Configuration of Client Terminal, Management Server, Lesson Assistance Apparatus FIG. 3 is a diagram for explaining a configuration example of the client terminal 20, the management server 30, and the lesson assistance apparatus 40. Each of the client terminal 20, the management server 30, and the lesson assistance apparatus 40 is basically configured with a computer. In FIG. 3, the lesson assistance apparatus 40 is described as a representative example. The lesson assistance apparatus 40 includes a control unit 401 that controls an operation of the entire apparatus, a storage unit 402 that stores image data and the like, and a communication interface (communication IF) 403 that performs communication via a LAN cable or the like.

The control unit 401 includes a CPU 411, a ROM 412 that stores firmware, BIOS, and the like, and a RAM 413 that is used as a work area. The CPU 411 may be a multi-core. The ROM 412 may be a rewritable non-volatile semiconductor memory. The storage unit 402 is a non-volatile storage device, and is configured with, for example, a hard disk drive (HDD), a semiconductor memory, or the like. The storage unit 402 stores a picture image of a document scanned by the image processing apparatus 10, a summary table in which a result of text recognition, presence or absence of a reading error, and the like are recorded, a list generated from the summary table, and the like. Further, the control unit 401 is connected to each unit via a bus 404 and a signal line (not illustrated).

The management server 30 according to the present exemplary embodiment also has a configuration similar to the configuration of the lesson assistance apparatus 40. The client terminal 20 according to the present exemplary embodiment is provided with, as additional components, a display unit that is used for displaying a work screen or the like, and an operation reception unit that receives an operation of a user. The display unit used in the client terminal 20 is configured with, for example, a liquid crystal display, an organic EL display, or the like. The display unit may be integrated with a main body of the client terminal 20, or may be connected to a main body of the client terminal 20, as an independent device. As the operation reception unit used in the client terminal 20, a keyboard used for text input, a mouse used for input such as pointer movement or selection on a screen, and the like are used.

Figure 4:
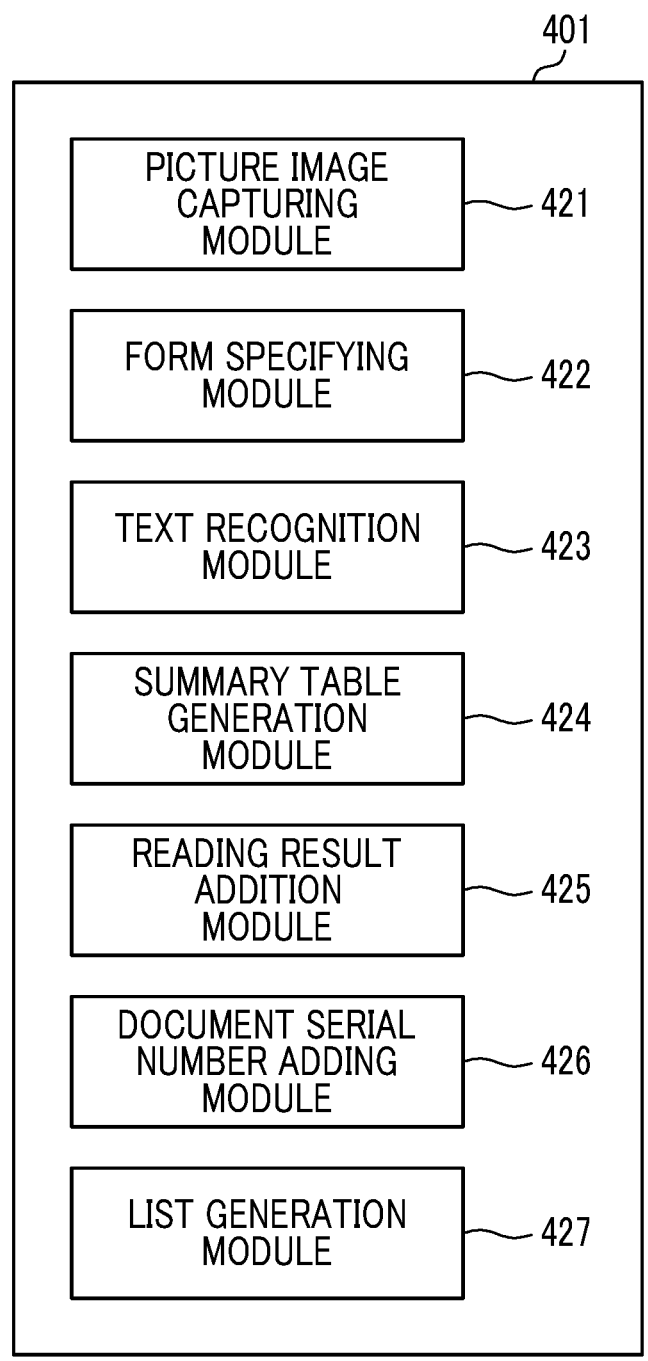
FIG. 4 is a diagram for explaining an example of a functional configuration of a control unit of the lesson assistance apparatus used in the first exemplary embodiment.

FIG. 4 is a diagram for explaining an example of a functional configuration of the control unit 401 of the lesson assistance apparatus 40 used in the first exemplary embodiment. The functional modules illustrated in FIG. 4 are realized by execution of a program by the CPU 411 (refer to FIG. 3). The module illustrated in FIG. 4 is a part of a program executed by the control unit 401.

The control unit 401 according to the present exemplary embodiment a picture image capturing module 421 that sequentially captures a picture image of each document in cooperation with the image processing apparatus 10 (refer to FIG. 1), a form specifying module 422 that specifies a form corresponding to the captured picture image, a text recognition module 423 that recognizes a text from a reading area defined for each form, a summary table generation module 424 that generates a summary table in which pieces of recognized information are arranged in a document unit, a reading result addition module 425 that adds contents of the reading result to the summary table, a document serial number adding module 426 that adds a serial number indicating in what number the document is read, and a list generation module 427 that generates a list to be presented to an operator.

Figure 5:
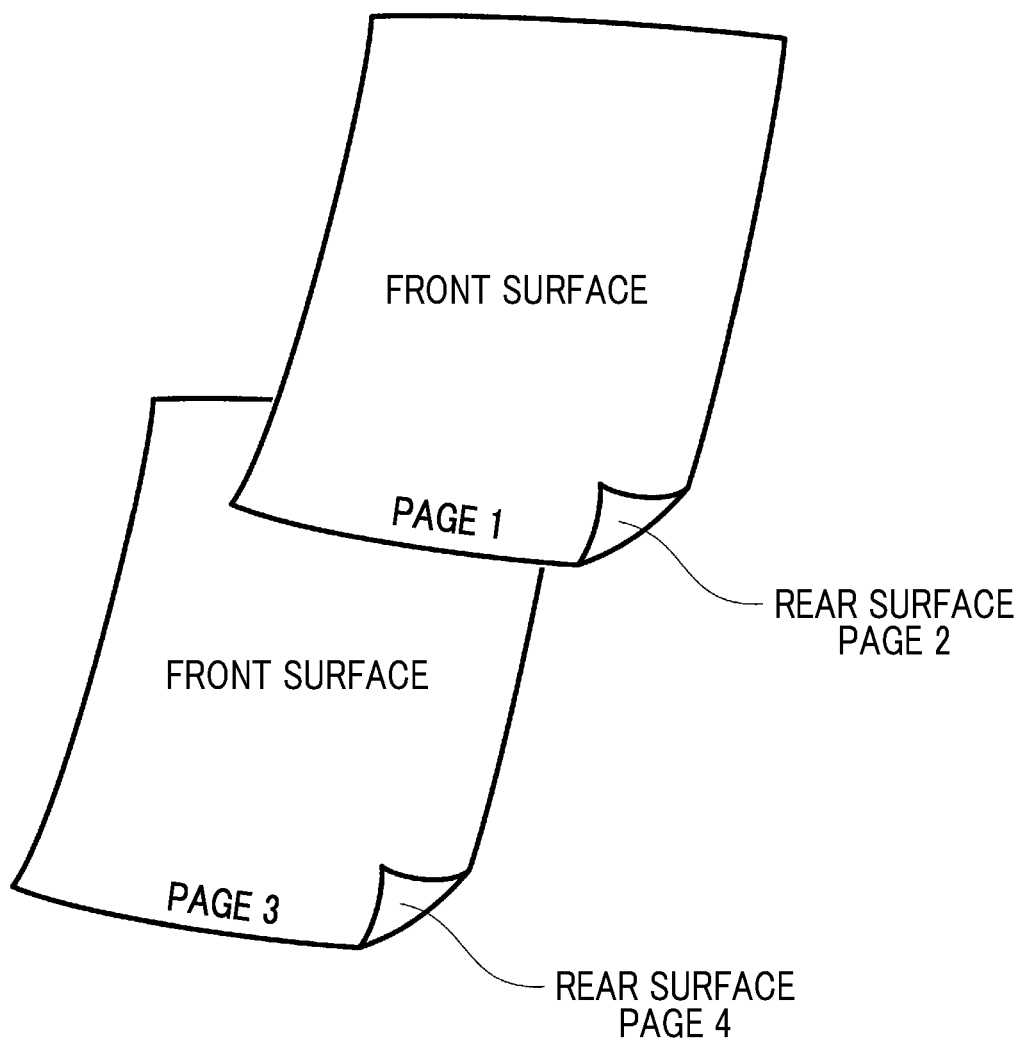
FIG. 5 is a diagram for explaining a relationship between a front surface and a rear surface of a document in a case where both surfaces of the document are read.

The picture image capturing module 421 according to the present exemplary embodiment captures a picture image which is read from a document in reading order in cooperation with the image processing apparatus 10 (refer to FIG. 1). The picture image capturing module 421 captures a picture image by distinguishing a front surface and a rear surface of a document. FIG. 5 is a diagram for explaining a relationship between a front surface and a rear surface of a document in a case where both surfaces of the document are read. In the example of FIG. 5, the front surface of the document corresponds to an odd page, and the rear surface of the document corresponds to an even page. The example of FIG. 5 is a case where two documents are treated as one pair. Thus, it is assumed that, a first front surface is a first page, a first rear surface is a second page, a second front surface is a third page, and a second rear surface is a fourth page. Alternatively, in a single document, a surface to be first read may be treated as a front surface, and a surface to be next read may be treated as a rear surface.

Figure 6:
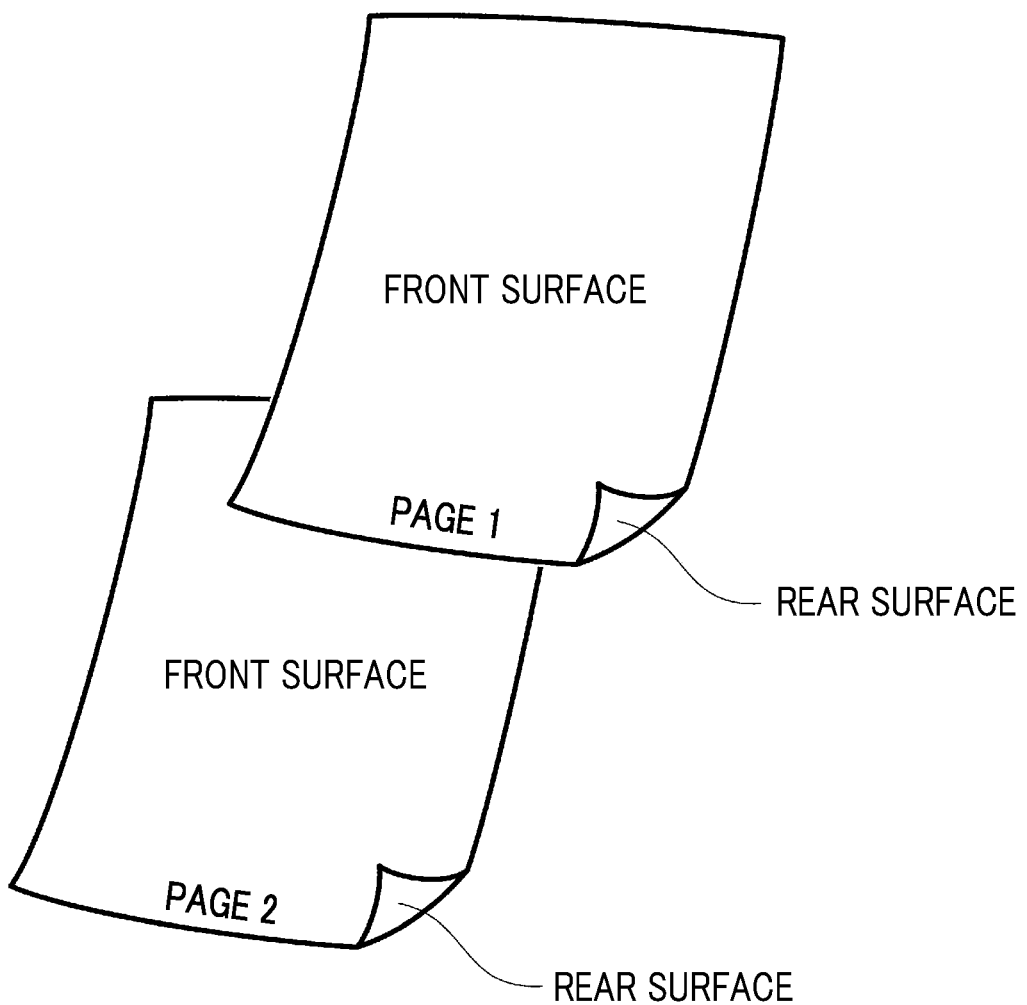
FIG. 6 is a diagram for explaining a relationship between a front surface and a rear surface of a document in a case where only one surface of the document is read.

FIG. 6 is a diagram for explaining a relationship between a front surface and a rear surface of a document in a case where only one surface of the document is read. In the example of FIG. 6, a page number is given only to the front surface. The example of FIG. 6 is a case where two documents are treated as one pair. In this case, it is assumed that a first front surface is a first page and a second front surface is a second page. In the example of FIG. 6, since rear surfaces are not to be read, page numbers are not distinguished.

Figure 7:
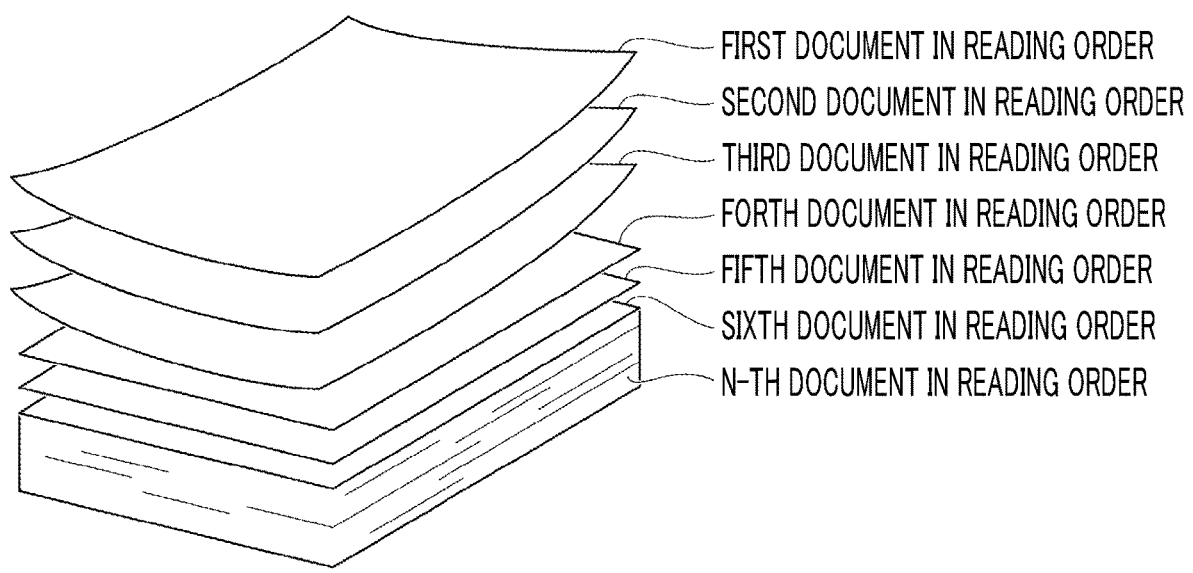
FIG. 7 is a diagram for explaining a reading order of documents according to the present exemplary embodiment.

The picture image capturing module 421 (refer to FIG. 4) acquires information indicating in what number each document is read from a bundle of documents, from the image processing apparatus 10 (refer to FIG. 1). FIG. 7 is a diagram for explaining a reading order of documents according to the present exemplary embodiment. FIG. 7 illustrates a bundle of documents in which a plurality of documents are stacked. Particularly, in FIG. 7, for convenience of description of a reading order, first to sixth documents in reading order are illustrated by being intentionally separated. In an actual bundle of documents, documents are stacked without gaps. In the case of FIG. 7, a picture image of a document is read in order from the top of the bundle of documents. Thus, a document located at the first from the top is the first document in reading order, and a document located at the second from the top is the second document in reading order. The same is true for other documents. The description returns to an explanation of FIG. 4.

Figure 8:
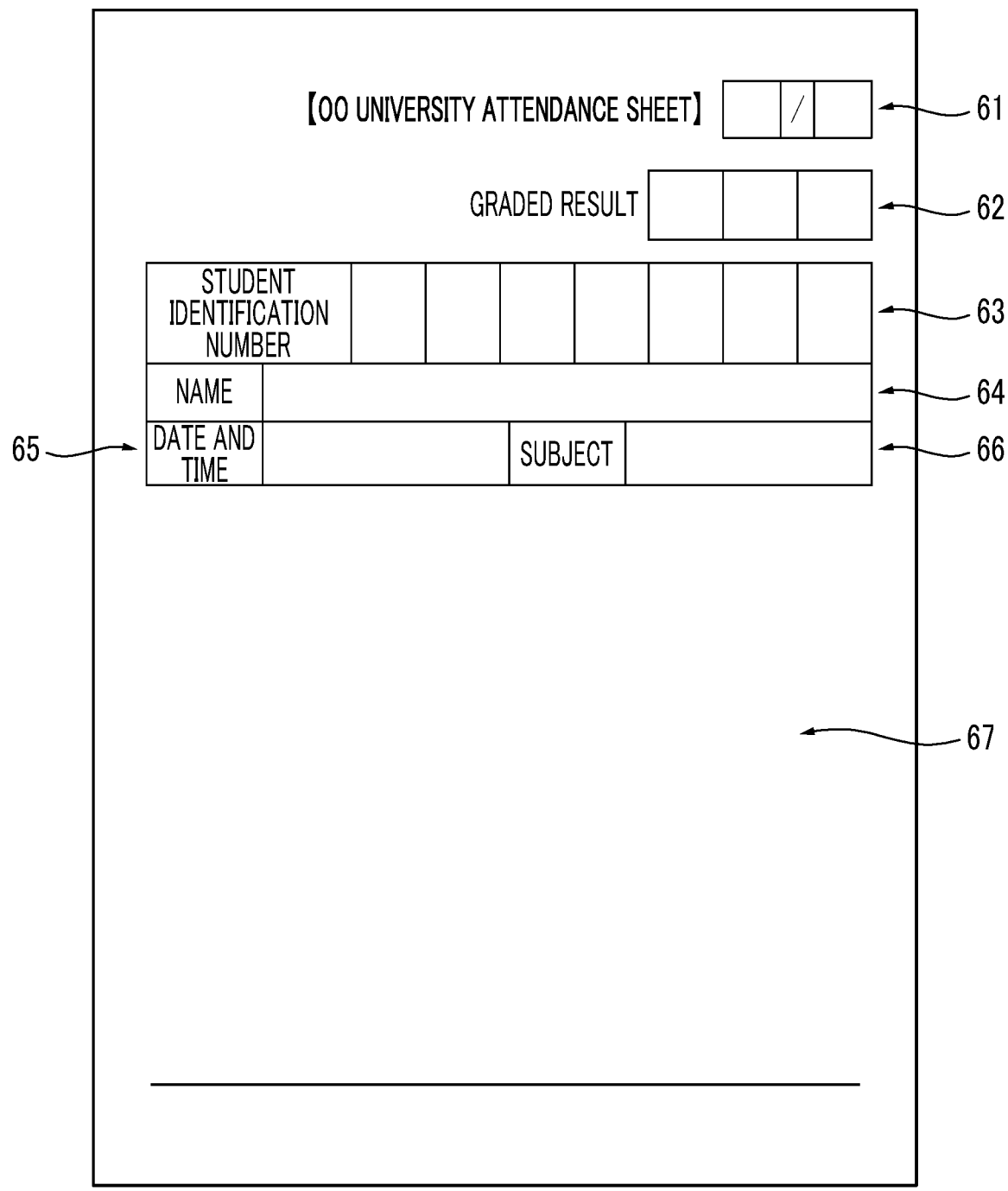
FIG. 8 is a diagram for explaining an example of a document in which nothing is written.

The form specifying module 422 specifies a form corresponding to the captured picture image, and sets a reading area to be used for text recognition. Which item of a form is to be text-recognized is determined in advance. FIG. 8 is a diagram for explaining an example of a document in which nothing is written. The document illustrated in FIG. 8 is a test/attendance sheet which is used in a certain university. In this attendance sheet, a field 61 for writing a total page number and a page number by handwriting, a field 62 for writing a graded result by handwriting, a field 63 for writing a student identification number by handwriting, a field 64 for writing a student's name by handwriting, a field 65 for writing the date and time of class attendance by handwriting, a field 66 for writing a subject that a student attends by handwriting, and a field 67 for writing an answer or the like by handwriting are included. The fields 61 to 66 are all surrounded by border lines.

The form specifying module 422 (refer to FIG. 4) according to the present exemplary embodiment sets an area corresponding to each of the fields 61 to 66, as a reading area. FIG. 9 is a diagram for explaining an example of a graded document. In the case of FIG. 9, all of a total page number and a reading page number are one page. The graded result is 15 points, and the student identification number is "1234567". In this example, the student identification number is given as a seven-digit text string. The student's name is "Taro, FUJI". The subject of the lesson is "Mathematics", and the date and time of the lesson is "2017/3/13".

FIG. 10 is a diagram for explaining another example of a graded document. The example of FIG. 10 corresponds to both surfaces of one document. In the case of FIG. 10, the front surface is a first page, and the rear surface is a second page. Thus, the total page number is 2. For this reason, "1/2" is written in the field 61 of the first page, and "2/2" is written in the field 61 of the second page. In the example of FIG. 10, a question grade field 68 is also included in each page. In the case of FIG. 10, a form of the front surface and a form of the rear surface are different. For this reason, areas to be read for text recognition are also individually set.

Returning to the explanation of FIG. 4, the text recognition module 423 recognizes a text written in a specified area of a picture image corresponding to each page, and outputs the recognition result as a text code. The recognized text string is linked to the item name of the corresponding field. The summary table generation module 424 generates a summary table in which pieces of information read from each document are arranged. In the present exemplary embodiment, the summary table is a master table in which all pieces of information related to reading of a document are summarized.

The reading result addition module 425 adds a processing result indicating contents of the reading result to the list generated from the summary table. For example, for a page on which reading is normally completed, "normal completion" is added to the list. On the other hand, for a page on which a reading error occurs, a cause of the error is added to the list. The cause of the error includes, for example, "page shortage", "failure in form specifying", and the like. The error means that reading is unsuccessfully completed. The reading result addition module 425 is an example of an extraction unit.

The document serial number adding module 426 adds, to the corresponding location of the summary table, a serial number indicating in what number the document is read from starting of reading, the document corresponding to the page to be read. The serial number is the same as the number indicating in what number the document is read, which is described in FIG. 7. FIG. 11 is a diagram for explaining an example of a summary table to which the reading result and the document serial number are added.

The summary table illustrated in FIG. 11 includes, from a left end column to the right side, a field 71 indicating a serial number of a reading page, a field 72 indicating a reading order of a document to be read, a field 73 indicating a distinction between a front surface and a rear surface, a field 74 indicating whether or not form specifying succeeds, a field 75 indicating a student identification number with which reading succeeds, a field 76 indicating a page number of the total page number, and a field 77 indicating the total page number. In the example of FIG. 11, due to a space limitation, pieces of information such as a name and a graded result, which are successfully read, are not included in the summary table.

In the example of FIG. 11, a student with a student identification number "1812001" writes the total page number of four pages in two documents, and submits an attendance sheet with the two documents. On the other hand, for a front surface of a document which is secondly read from starting of reading, form specifying is failed. For this reason, "NG" is illustrated in FIG. 11. Since form specifying is failed, the fields on the same page such as the student identification number field and the page number field are blank.

A student with a student identification number "1812010" writes the total page number of two pages in one document, and submits an attendance sheet with the one document. In the case of FIG. 11, the document of the student corresponds to a document which is thirdly read from starting of reading.

As illustrated in FIG. 11, for both of a front surface and a rear surface of the thirdly-read document, form specifying succeeds. Thus, "OK" is illustrated in FIG. 11.

On the other hand, whether to specify a form is different from whether to recognize a written text. For example, although a form can be specified, in a case where texts of the student identification number are thin, the student identification number cannot be recognized. In the example of FIG. 11, for both of a front surface and a rear surface of the document, the student identification number is successfully recognized. Further, for a front surface of a document corresponding to a student with a student identification number "1812010", the page number is "1" and the total page number is "2". On the other hand, for a rear surface of the document, the page number is "2" and the total page number is "2".

A student with a student identification number "1812020" writes the total page number of one page in one document, and submits an attendance sheet with the one document. In the example of FIG. 11, for the document which is fourthly read from starting of reading, form specifying for a front surface of the document succeeds, but form specifying for a rear surface of the document is failed. It is because the student identification number and the like are not written in the rear surface of the document. Since form specifying is failed, the fields on the same page such as the student identification number field and the page number field are blank. On the other hand, since the total page number of the document is written as one page, there is no problem in the read page even in a case where form specifying of the rear surface is failed. Thus, the fourthly-read document is treated as a normally-processed document.

Returning to the explanation of FIG. 4, the list generation module 427 generates a list that an operator uses to confirm the reading result, based on the summary table. In the present exemplary embodiment, the list includes, for a purpose of improving work efficiency by an operator, an area in which pieces of information of documents on which reading is normally completed are collectively arranged, and an area in which pieces of information of documents with a reading error are collectively arranged. As described above, by distinguishing a collection of pieces of information of documents on which reading is normally completed and a collection of pieces of information of documents with a reading error, compared to a case where pieces of information of two types of documents are displayed in a disorderly-mixed state, it becomes easier to find a document with a reading error.

Here, the document on which reading is normally completed means a document on which a reading error does not occur in reading of both of a front surface and a rear surface. On the other hand, the document on which a reading error occurs includes not only a document on which a reading error occurs in reading of both of the front surface and the rear surface, but also a document on which a reading error occurs in reading of either one of the front surface or the rear surface. For example, a document on which reading of the front surface is successfully completed but a reading error occurs in reading of the rear surface is classified as a document with a reading error. The reading error includes a failure in form specifying, a page shortage, and the like. In a case where a form cannot be specified, it is difficult to specify an area of the picture image on which text recognition is performed. Further, it is difficult to correlate information obtained by text recognition with an item. On the other hand, in a case where the total page number is known, a page shortage can be confirmed by finding an unread page number.

FIG. 12 is a diagram for explaining an example of a list displayed on the client terminal 20 (refer to FIG. 1) operated by an operator who performs a reading operation of a picture image. The operator includes, for example, a teacher, an assistant who assists a teacher in his/her work, and the like. The list is an example of a list of summary results. The list illustrated in FIG. 12 includes, from a left end column to the right side, a field 81 indicating an index number, a field 82 indicating a reading order of a document to be read, a field 83 indicating a distinction between a front surface and a rear surface, a field 84 indicating contents of a processing result, and a field 85 indicating a student identification number with which reading succeeds.

The list includes a row 86 in which pieces of information of documents on which reading is normally completed are collected, and a row 87 in which pieces of information of documents with a reading error are collected. In the present exemplary embodiment, the row 86 is mapped to an upper part of the list, the row 86 in which pieces of information of documents on which reading is normally completed are collected. Further, the row 87 is mapped to a lower part of the list, the row 87 in which pieces of information of documents with a reading error are collected. As described above, since the total page number of the fourthly-read document is one page, even in a case where reading of an unrequired rear surface is failed, it is considered that reading is normally completed. This is because all pages of the total page number are read. Thus, information of the student with the student identification number "1812020" is mapped to the row 86.

A feature of display of the row 87 of the list illustrated in FIG. 12 is that processing results of a front surface and a rear surface of one document are displayed side by side in upper and lower two rows. In the example of FIG. 12, reading information of the student with the student identification number "1812001", which corresponds to the documents firstly and secondly read from starting of reading, is mapped to the row 87. This is because the third page is missing even though the total page number for the student with the student identification number "1812001" is four. In the row 87, pieces of information of the front surface and the rear surface of the documents firstly and secondly read from starting of reading are displayed side by side, the documents being documents submitted by the same student. This is because, in a case of the secondly-read document, reading of the rear surface is normally completed but form specifying of the front surface is failed. In a case of the firstly-read document, the front surface and the rear surface are normally read, but all pages of the same student are not aligned. Thus, the firstly-read document is treated as a page shortage.

By using the list illustrated in FIG. 12, the operator is able to easily confirm an occurrence of a reading error. Further, information of a document with a reading error includes a number indicating in what number the document is read from a bundle of documents. Therefore, even in a case of searching for a document with a reading error from a bundle of documents, the operator can easily find the corresponding document. The list generation module 427 is an example of a generation unit.

Example of Processing Operation

Hereinafter, a processing operation according to the first exemplary embodiment will be described. First, a preparation step will be described. As a preparation step, a teacher grades test/attendance sheets collected from students. The test/attendance sheet is hereinafter referred to as a document. The documents are not necessarily sorted in order of student identification number or in order of name. Thereafter, the operator places a bundle of graded documents in a paper feeding tray of the auto document feeder.

Figure 13:
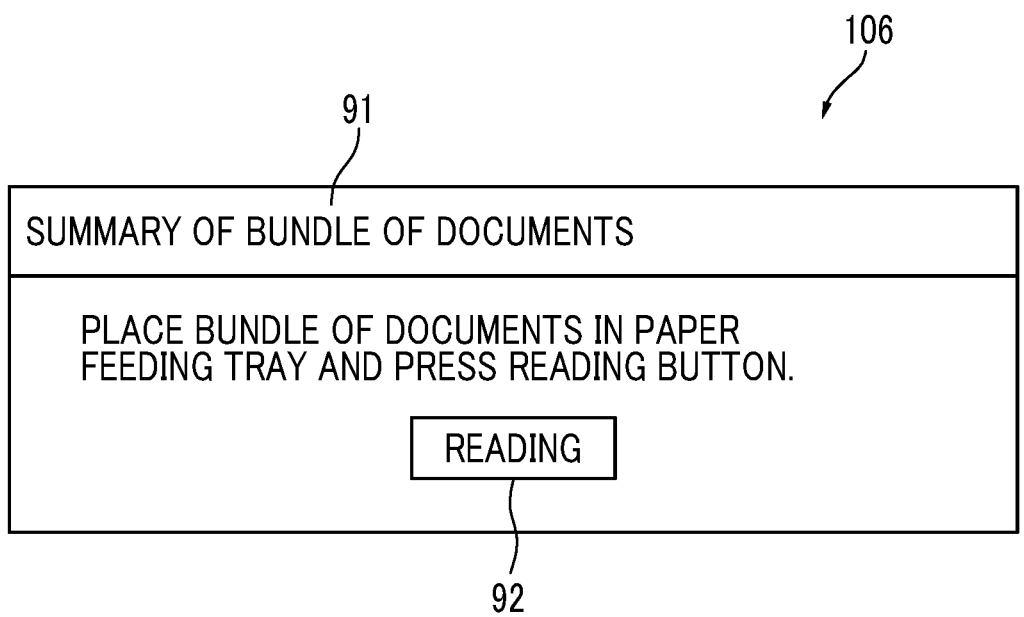
FIG. 13 is a diagram illustrating an example of a guidance screen displayed on a display unit of the image processing apparatus.

In this step, the operator instructs to read the bundle of documents. FIG. 13 is a diagram illustrating an example of a guidance screen 91 displayed on the display unit 106 of the image processing apparatus 10 (refer to FIG. 1). In the case of FIG. 13, a message such as "Place a bundle of documents in the paper feeding tray and press a reading button." is displayed on the guidance screen 91. The operator taps a reading button 92 according to the instruction on the guidance screen 91.

Figure 14:
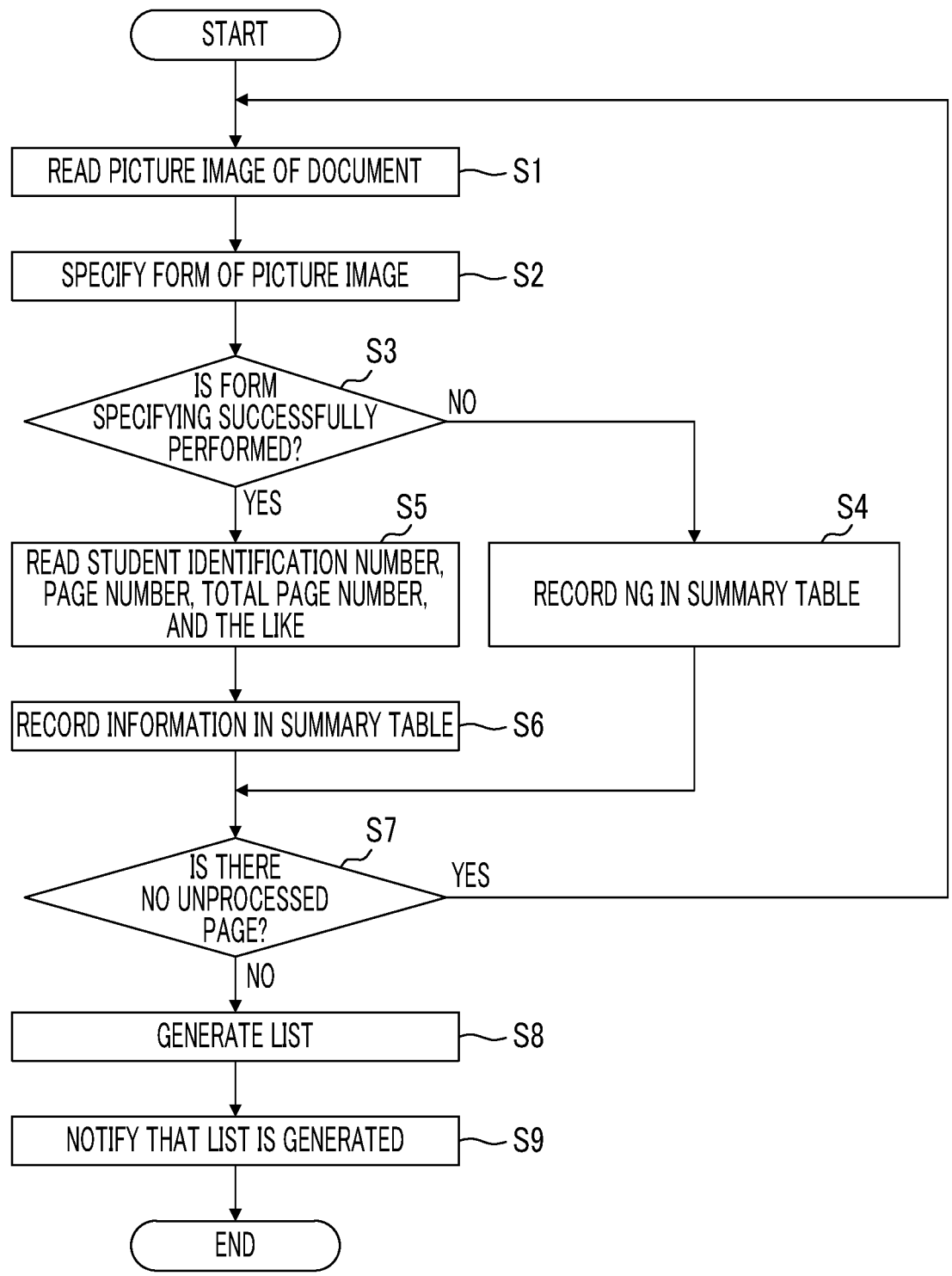
FIG. 14 is a flowchart illustrating an example of a processing operation performed by the information processing system.

Thereafter, processing by the information processing system 1 is started. FIG. 14 is a flowchart illustrating an example of a processing operation performed by the information processing system 1. The symbol S in FIG. 14 means step. In a case where the operator taps the reading button 92, the image reading unit 101 (refer to FIG. 2) starts reading of the documents. The auto document feeder (not illustrated) picks up the bundle of documents one by one, and reads picture images of the documents one by one in order (step S1). In reading of the picture images, reading of a front surface and reading of a rear surface are distinguished. The picture image of the front surface and the picture image of the rear surface, which are read from one document, are respectively transmitted to the lesson assistance apparatus 40 (refer to FIG. 1) in order.

The lesson assistance apparatus 40 specifies a form of the received picture image (step S2). The form specifying is performed by comparing the received picture image with an image of a form prepared in advance. In a case where a form of the received picture image is specified, a reading area for text recognition is also determined. Next, the lesson assistance apparatus 40 determines whether or not the form specifying is successfully performed (step S3). In step S3, in a case where the determination result is No, the lesson assistance apparatus 40 records NG in the summary table (refer to FIG. 11) (step S4), and the process proceeds to step S7.

The lesson assistance apparatus 40 records a serial number indicating in what number the document being processed is read from starting of reading, in the summary table, in correlation with NG. In the present exemplary embodiment, determination of a reading error is performed in a page unit. In other words, the determination of a reading error is performed in a surface unit. Thus, the form specifying in step S2, the determination in step S3, and the NG recording in step S4 are also performed in a page unit.

In step S3, in a case where the determination result is Yes, the lesson assistance apparatus 40 reads a student identification number, a page number, a total page number, and the like, from the reading area which is set on the specified form (step S5). Next, the lesson assistance apparatus 40 records the read information in the summary table (step S6). The reading in step S5 and the recording in step S6 are also performed in a page unit. As described above, a reading number of the corresponding document is also recorded in a record of each page. Thereafter, the lesson assistance apparatus 40 determines whether or not there is an unprocessed page (step S7).

In step S7, in a case where the determination result is Yes, the lesson assistance apparatus 40 returns to step S1. On the other hand, in step S7, in a case where the determination result is No, the lesson assistance apparatus 40 generates a list (refer to FIG. 12) using the summary table (step S8). The lesson assistance apparatus 40 records both of the summary table and the list in the management server 30 (refer to FIG. 1). Thereafter, the lesson assistance apparatus 40 notifies the client terminal 20 (refer to FIG. 1) operated by an operator who performs a reading operation that the list is generated (step S9).

Figure 15A:
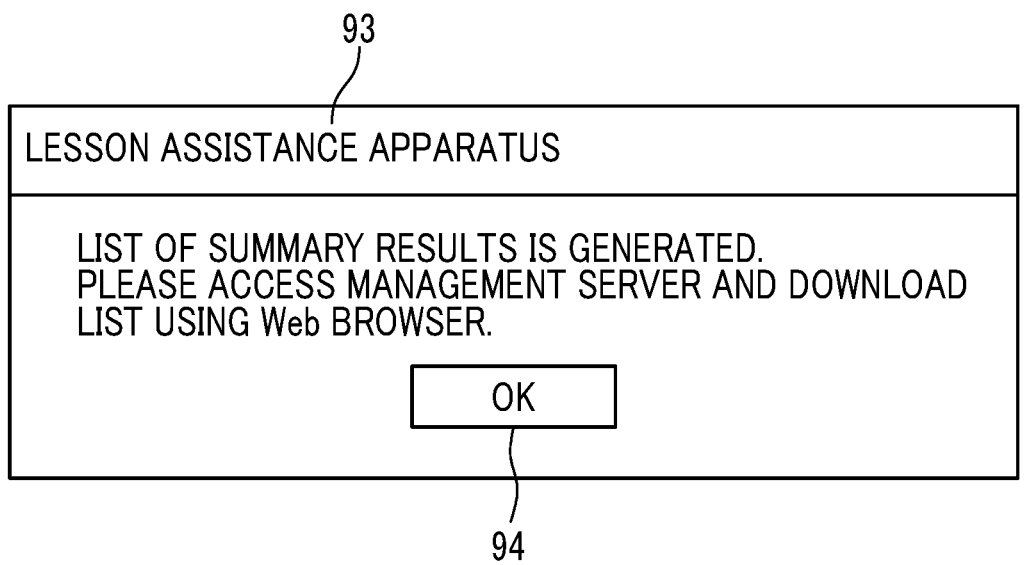
FIGS. 15A and 15B are diagrams illustrating an example of a screen displayed on the client terminal operated by an operator who performs a document reading operation.
Figure 15B:
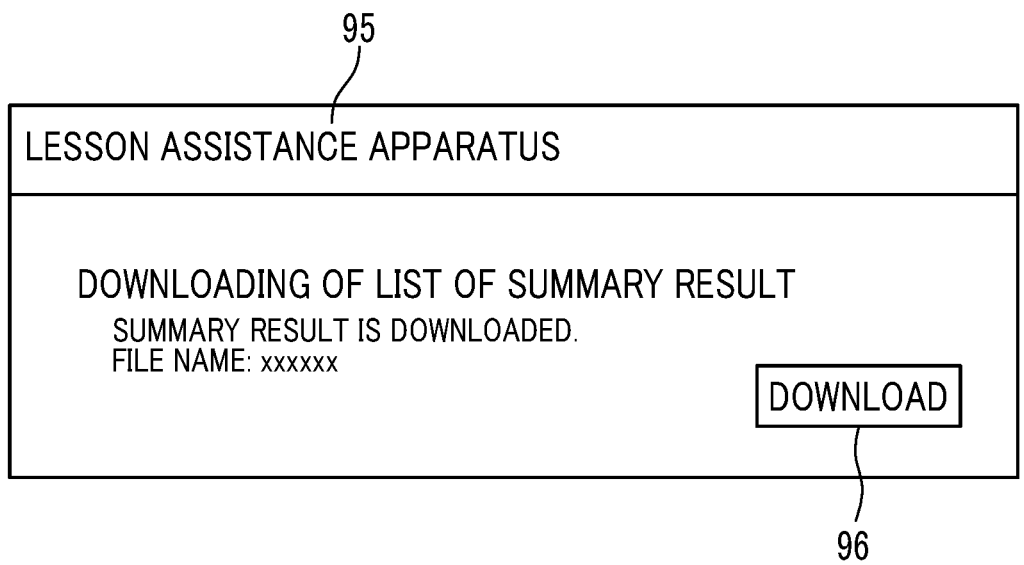

FIGS. 15A and 15B are diagrams illustrating an example of a screen displayed on the client terminal 20 operated by an operator who performs a document reading operation. FIG. 15A illustrates a screen 93 for notifying generation of the list, and FIG. 15B illustrates a screen 95 used for downloading the list. In the case of FIG. 15A, a message such as "A list of summary results is generated. Please access the management server and download the list using a web browser." and an OK button 94 are displayed on the screen 93. In a case where the OK button 94 is operated, the screen 95 is displayed. In the case of FIG. 15B, a message such as "Downloading of the list of summary results", a message explaining an operation to be executed in a case where the download button 96 is operated, and a file name of a file to be downloaded are displayed on the screen 95. In a case where the downloaded file is opened, the list illustrated in FIG. 12 is displayed.

Second Exemplary Embodiment

Subsequently, a second exemplary embodiment will be described. In the present exemplary embodiment, the information processing system 1 illustrated in FIG. 1 is also used. That is, in the present exemplary embodiment, the information processing system 1 including the image processing apparatus 10, the client terminal 20, the management server 30, and the lesson assistance apparatus 40 is also used. On the other hand, in the present exemplary embodiment, a new function is added to the lesson assistance apparatus 40.

Configuration of Lesson Assistance Apparatus

Figure 16:
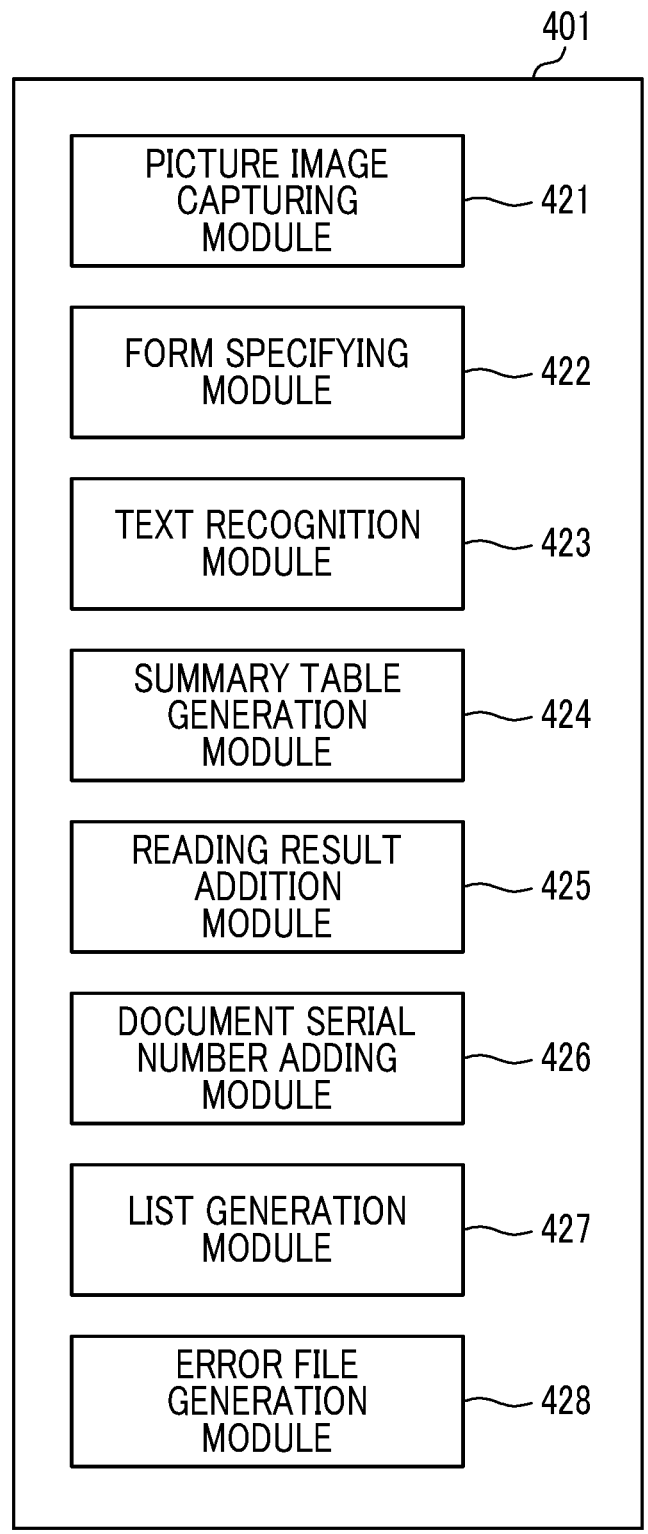
FIG. 16 is a diagram for explaining an example of a functional configuration of the control unit of the lesson assistance apparatus used in a second exemplary embodiment.

FIG. 16 is a diagram for explaining an example of a functional configuration of the control unit 401 of the lesson assistance apparatus 40 used in a second exemplary embodiment. In FIG. 16, the same components as those illustrated in FIG. 4 are denoted by the same reference numerals. The functional modules illustrated in FIG. 16 are also realized by execution of a program by the CPU 411 (refer to FIG. 3). The module illustrated in FIG. 16 is a part of a program executed by the control unit 401. The present exemplary embodiment is different from the functional configuration described in the first exemplary embodiment in that a function of an error file generation module 428 is added.

The error file generation module 428 generates an error file in which error information is described in a document unit. In the present exemplary embodiment, the error file is generated as a portable document format (PDF) document. Thus, the error file includes page information of a front surface and page information of a rear surface. In the error file, the page order depends on a reading order of both surfaces corresponding to one document. For example, in a case where a rear surface is firstly read, in the error file, a first page is the rear surface and a next page is the front surface. A file name of the generated error file is displayed in association with the corresponding document of the list.

The error file generation module 428 according to the present exemplary embodiment adds a number indicating in what number a document is read, to a part of the file name of the error file, according to a predetermined rule. In a case where the rule of the file name is known, only by confirming the file name, it is possible to recognize a reading order of a document with a reading error. In the present exemplary embodiment, a number indicating in what number a document is read from starting of reading is added to a head of the file name. In a case where a number indicating in what number a document is read is added to a head of the file name, by sorting the file names in order of initial letters, it is possible to arrange error information in a reading order of a document.

Example of Processing Operation

Figure 17:
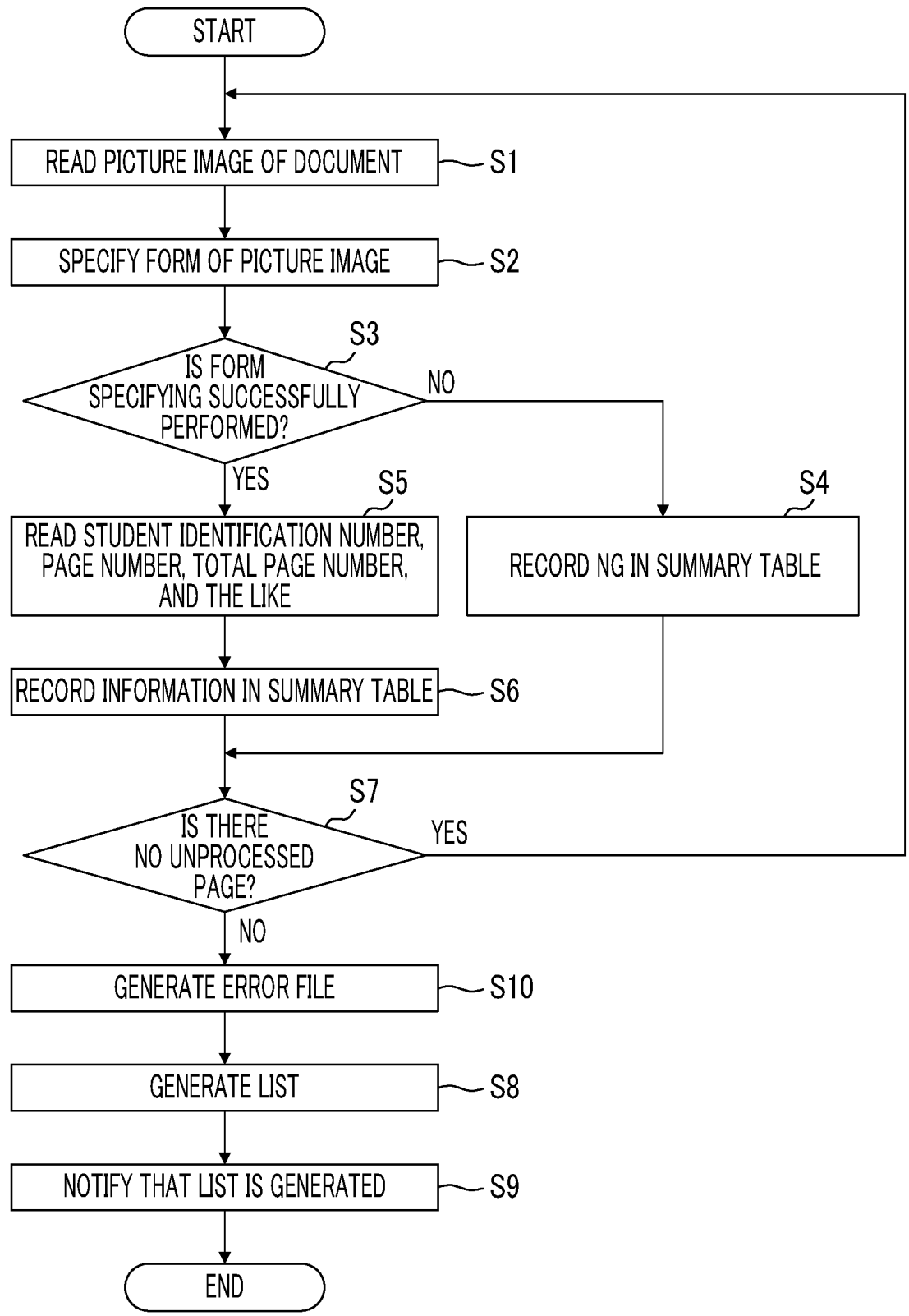
FIG. 17 is a flowchart illustrating an example of a processing operation performed by the information processing system.

Hereinafter, a processing operation according to the second exemplary embodiment will be described. FIG. 17 is a flowchart illustrating an example of a processing operation performed by the information processing system 1. In FIG. 17, the same steps as those illustrated in FIG. 14 are denoted by the same reference numerals. The processing operation illustrated in FIG. 17 is different from that illustrated in FIG. 14 in that processing (step S10) for generating an error file is added after step S7. As described above, in step S7, in a case where the determination result is No, a summary table, in which reading results of all of documents to be read are collected, is generated.

In the present exemplary embodiment, the lesson assistance apparatus 40 generates an error file for a document including a page with a reading error (step S10). At this time, the lesson assistance apparatus 40 adds a number indicating in what number the corresponding document is read, to a head of a file name of the error file. In the present exemplary embodiment, in step S8 to be executed after step S10, the lesson assistance apparatus 40 generates a list including the file names.

FIG. 18 is a diagram for explaining another example of a list displayed on the client terminal 20 (refer to FIG. 1) operated by an operator who performs a reading operation of a picture image. In FIG. 18, the same fields as those illustrated in FIG. 12 are denoted by the same reference numerals. A configuration of the list illustrated in FIG. 18 is basically the same as the configuration of the list illustrated in FIG. 12. A difference between the lists is that a field 88 indicating a file name of an error file is added to a right end of the list illustrated in FIG. 18.

In the example of FIG. 18, the file name of the error file is displayed in a portion of the row 87, in which pieces of information of documents with a reading error are collected. For example, documents with the student identification number "1812001" are firstly and secondly read from starting of reading. Thus, for a front surface and a rear surface corresponding to the same document, file names "1-1812001.pdf" and "2-1812001.pdf" are displayed. In the case of the file name, a head text "1" indicates that the document is firstly read from starting of reading, and a head text "2" indicates that the document is secondly read from starting of reading.

In the present exemplary embodiment, the same file name is displayed in each of a row corresponding to a front surface and a row corresponding to a rear surface. This is because the reading error is managed in a page unit. Further, even in a case where pieces of information of reading results corresponding to a front surface and a rear surface of the same document are not displayed side by side by sorting or the like, since the file name is correlated with each page, it is easy to find the corresponding document. Furthermore, in the present exemplary embodiment, link information to the error file is included in the file name.

Other Exemplary Embodiments

As described above, although the exemplary embodiments according to the present invention have been described, the technical scope of the present invention is not limited to the scope described in the exemplary embodiments. It is apparent from the spirit of the claims that an embodiment obtained by applying various modifications and improvements in the form of the exemplary embodiment described herein falls within a technical scope of the present invention.

The image processing apparatus 10 (refer to FIG. 1) according to the exemplary embodiment is intended to read a paper document handled by an educational institution. On the other hand, a paper document to be read is not limited to a document handled by an educational institution. For example, a document handled in another field such as tax, insurance, medical care, finance, government service, custom, delivery, or post may be used. In a case where a document handled in another field is used, the lesson assistance apparatus 40 may be considered as a task assistance apparatus. In the case of the exemplary embodiments, the lesson assistance apparatus 40 is treated as an apparatus independent of the image processing apparatus 10. On the other hand, the lesson assistance apparatus 40 and the image processing apparatus 10 may be integrated as one apparatus. For example, the lesson assistance apparatus 40 may be incorporated in the image processing apparatus 10. The lesson assistance apparatus 40 may be realized as a cloud server or an on-premises server.

In the exemplary embodiments, an example in which the client terminal 20 browses and confirms the list generated by the lesson assistance apparatus 40 is described. On the other hand, the lesson assistance apparatus 40 may have a function of automatically printing the generated list. Specifically, the lesson assistance apparatus 40 may have a function of automatically transmitting print data corresponding to the list to the image processing apparatus 10 at the same time when the list of the summary results is generated. Of course, this is based on a premise that the image processing apparatus 10 has a function of printing an image. On the other hand, the image processing apparatus 10 used in document reading may not have a function of printing an image, and may transmit print data of the list to a printing apparatus provided near the image processing apparatus 10 used in document reading. In a case where the image processing apparatus 10 has a function of transmitting print data of the list, the document reading result can be confirmed at a place at which reading is performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a scanner, configured to optically read one by one in order a bundle of a plurality of documents including written information, wherein each of the plurality of documents comprises a front surface and a rear surface; and
   a processor, configured to:
      extract a document on which reading is unsuccessfully completed in a surface unit; and
      generate a list of summary results that comprises a plurality of records, wherein each of the plurality of records corresponds to a surface among the front surface and the rear surface of the document on which the reading is unsuccessfully completed, each of the plurality of records includes a reading order of the document on which the reading is unsuccessfully completed and an identification of the surface among the front surface and the rear surface on which the reading is unsuccessfully.

2. The information processing apparatus according to claim 1,
wherein a file in which a number indicating in what number each document including a surface is read from the bundle of documents is included in a part of a file name is generated, the surface being a surface on which reading is unsuccessfully completed.

3. The information processing apparatus according to claim 2,
wherein the number is included in a head of the file name.

4. The information processing apparatus according to claim 2,
wherein the file name is correlated with a record of each document of the list.

5. The information processing apparatus according to claim 1,
wherein records are arranged in the list of the summary results, the records corresponding to a front surface and a rear surface of each document including a surface on which reading is unsuccessfully completed.

6. The information processing apparatus according to claim 5,
wherein records of a document on which reading of both of a front surface and a rear surface is successfully completed are collectively mapped in an upper part of the list, and records of a document including a surface on which reading is unsuccessfully completed are collectively mapped in a lower part of the list.

7. The information processing apparatus according to claim 1,
wherein, in a case where the list is generated, the list is automatically output.

8. A non-transitory computer readable medium storing a program causing a computer to execute:
a function of reading one by one in order a bundle of a plurality of documents including written information, wherein each of the plurality of documents comprises a front surface and a rear surface;
a function of extracting a document on which reading is unsuccessfully completed; and
a function of generating a list of summary results that comprises a plurality of records, wherein each of the plurality of records corresponds to a surface among the front surface and the rear surface of the document on which the reading is unsuccessfully completed, each of the plurality of records includes a reading order of the document on which the reading is unsuccessfully completed and an identification of the surface among the front surface and the rear surface on which the reading is unsuccessfully completed.

9. A method, comprising:
reading one by one in order a bundle of a plurality of documents including written information, wherein each of the plurality of documents comprises a front surface and a rear surface;
extracting a document on which reading is unsuccessfully completed; and
generating a list of summary results that comprises a plurality of records, wherein each of the plurality of records corresponds to a surface among the front surface and the rear surface of the document on which the reading is unsuccessfully completed, each of the plurality of records includes a reading order of the document on which the reading is unsuccessfully completed and an identification of the surface among the front surface and the rear surface on which the reading is unsuccessfully completed.

* * * * *